S. C. Ellis,
Journal Box.
No. 99,422. Patented Feb. 1, 1870.

Witnesses:
Fred. Haynes
Ferd. Tuerk

Seth C. Ellis

United States Patent Office.

SETH C. ELLIS, OF JERSEY CITY, NEW JERSEY.

Letters Patent No. 99,422, dated February 1, 1870.

IMPROVEMENT IN JOURNAL-BOXES.

The Schedule referred to in these Letters Patent and making part of the same.

*To all whom it may concern:*

Be it known that I, SETH C. ELLIS, of Jersey City, in the county of Hudson, and State of New Jersey, have invented a new and useful Improvement in Journal-Boxes, of which the following is a full, clear, and exact description, reference being had to the accompanying drawing, forming part of this specification, and in which—

Figure 1:
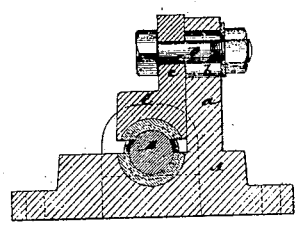
Figure 2:
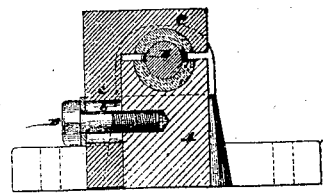

Figure 1 represents a vertical section, taken transversely through the shaft of a journal-box, constructed in accordance with my improvement, and as applied to the shaft;

Figure 2, a similar view of a modification of the same; and

Figure 3:
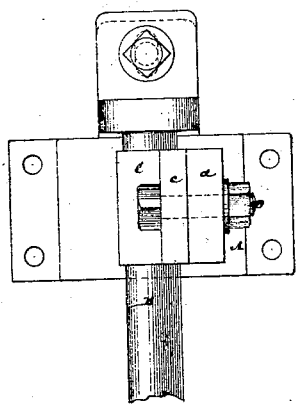
Figure 4:
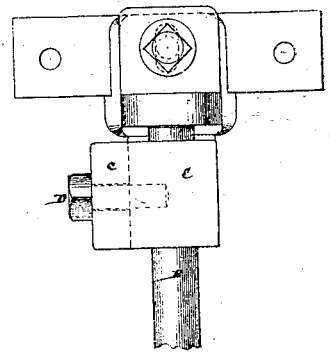

Figures 3 and 4, plans thereof.

Similar letters of reference indicate corresponding parts.

My improvement consists in a novel connection of the cap or gland with the base portion of the journal-box, whereby, under a horizontal arrangement of the base, said cap is made to bear down upon the shaft, or is restrained from lift, by its weight acting in combination with friction, through a guiding-action or bearing, it is made to have, on or against the base-portion, under control of a holding-screw, arranged to occupy a tangential relation to the shaft, so that in tightening up, said screw exerts no force to press the cap down upon the bearing, but, on slackening, allows of the cap falling to adjust itself to the bearing. By this improvement, a self-adjusting character is given to the journal-box, and an easy or gentle bearing of the cap down upon or against the shaft, free from any binding-action by the holding-screw, is secured.

Referring, in the first instance, to figs. 1 and 3 of the drawing—

A represents the base or fixed portion of the journal-box, the base or ground-surface of which will here be assumed to occupy a horizontal position.

B is the shaft; and

C, the movable portion, cap, or gland of the box.

The base-portion A of the box is formed with an upright arm or side, *a*, having a vertically oblong slot, *b*, through it, and the movable portion or cap C constructed with a similar arm or side, *c*, which fits or bears against the inner face of the fixed arm *a*, so that the latter acts as a friction or bearing and guiding-surface to the cap C, on its being slid toward or from the shaft B, and also operates as a holding-surface for the cap, when secured to the base-portion by a screw-bolt, D, arranged to pass, in tangential relation to the shaft, through the arm *c* of the cap, and slot *b* of the arm *a* of the fixed portion of the box.

On slackening this bolt D, or nut on the end of it, the cap C is free to adjust itself to the shaft B, and its weight, in combination with its frictional bearing against the arm *a*, restrains it from being lifted, when only slightly secured by the screw-bolt D, so that said cap has a self-adjusting and gentle, yet close bearing secured to it on the shaft, and no further tightening of the screw-bolt will cause it to bind or bear unduly hard thereon. Thus there is no particularity necessary as regards the adjustment of the holding-screw, to secure a perfect—that is, neither too hard nor too loose— fit of the cap to the shaft, as occurs in the ordinary mode of fitting and securing the gland or cap of journal-boxes.

In figs. 2 and 4, substantially the same arrangement is shown, but here the arm or side *c* of the cap C is inverted, and made to bear against the lower or block-portion of the base A, and the same secured by a screw, D, arranged to pass through a slot, *b*, in the arm *c*, and to screw into said block-portion of the base A.

In certain cases, two caps or glands, arranged to diverge from each other, and made to bear or rest on inclined upper surfaces formed in or on upper extension of the base-portion of the box, may be used, the arms or sides of said caps being slotted, for insertion of the holding-screws through them, to secure a like action of the cap or gland, as hereinbefore described, although there may be employed, in addition, if desired, adjusting-screws at top of the base-portion, to facilitate the setting down of the cap on the holding-screws, which secure the caps to the base-portion, being sufficiently slackened for the purpose.

What is here claimed, and desired to be secured by Letters Patent, is—

The holding-screw D, arranged in a position tangential to the shaft, in combination with the sliding or self-adjusting cap C and stationary portion A of the box, substantially as specified.

SETH C. ELLIS.

Witnesses:
FRED. HAYNES,
HENRY PALMER.